United States Patent
Shoev et al.

(10) Patent No.: US 9,285,828 B2
(45) Date of Patent: Mar. 15, 2016

(54) MEMORY SYSTEM WITH IMPROVED BUS TIMING CALIBRATION

(71) Applicant: Apple Inc., Cupertino, CA (US)

(72) Inventors: Roni Shoev, Moshav Mishmeret (IL); Yoav Kasorla, Kfar Netar (IL)

(73) Assignee: Apple Inc., Cupertino, CA (US)

(*) Notice: Subject to any disclaimer, the term of this patent is extended or adjusted under 35 U.S.C. 154(b) by 351 days.

(21) Appl. No.: 13/939,588

(22) Filed: Jul. 11, 2013

(65) Prior Publication Data

US 2015/0019899 A1  Jan. 15, 2015

(51) Int. Cl.
*G06F 1/08* (2006.01)
*G06F 1/10* (2006.01)

(52) U.S. Cl.
CPC ... *G06F 1/10* (2013.01); *G06F 1/08* (2013.01)

(58) Field of Classification Search
CPC ..................................... G06F 1/08; G06F 1/10
See application file for complete search history.

(56) References Cited

U.S. PATENT DOCUMENTS

| 6,763,444 B2* | 7/2004 | Thomann .................. G11C 7/22 702/89 |
| 7,356,435 B2* | 4/2008 | Sato .................. G01R 31/31928 702/118 |
| 8,214,616 B2 | 7/2012 | Ware et al. |
| 2011/0216611 A1 | 9/2011 | Giovannini et al. |
| 2012/0250434 A1 | 10/2012 | Song |

* cited by examiner

*Primary Examiner* — Thuan Du
(74) *Attorney, Agent, or Firm* — Meyertons, Hood, Kivlin, Kowert & Goetzel, P.C.

(57) ABSTRACT

A method includes communicating between a memory controller and multiple memory devices over an interface that includes at least a control signal and an information signal. For each memory device, a respective individual skew parameter, which is indicative of a timing misalignment between the control signal and the information signal when communicating with that memory device, is produced. The respective individual skew parameter is stored coupled to each memory device. The timing misalignment is corrected at the memory device using the stored individual timing skew.

18 Claims, 3 Drawing Sheets

MEMORY SYSTEM WITH IMPROVED BUS TIMING CALIBRATION

FIELD OF THE INVENTION

The present invention relates generally to memory systems, and particularly to methods and systems for timing calibration of interface signals.

BACKGROUND OF THE INVENTION

Many memory systems comprise a memory controller that controls multiple memory devices. The memory controller communicates with the memory devices over an interface that carries information and control signals. Standards related to interfacing memory controllers to memory devices include, for example, Toggle 1.0 and Toggle 2.0, open NAND flash interface—ONFI 3.0, and double data rate (DDR) synchronous dynamic random-access memory (SDRAM)—DDR2 SDRAM and DDR3 SDRAM.

To ensure reliable communication, the signals that propagate along the interface (also referred to as a bus) should be properly time-aligned when arriving at either the memory controller or at the memory devices. U.S. Pat. No. 8,214,616, whose disclosure is incorporated herein by reference, describes a memory controller that may comprise a first transmitter to output first and second write commands synchronously with respect to a clock signal, a second transmitter to output first data using a first timing offset such that the first data arrives at a first memory device in accordance with a predetermined timing relationship with respect to a first transition of the clock signal, and a third transmitter to output second data using a second timing offset such that the second data arrives at a second memory device in accordance with a predetermined timing relationship with respect to a second transition of the clock signal.

U.S. Patent Application Publication 2011/0216611, whose disclosure is incorporated herein by reference, describes a system that calibrates timing relationships between signals involved in performing write operations. The memory controller is configured to perform one or more write-read-validate operations to calibrate a clock-cycle relationship between the data-strobe signal and the clock signal.

SUMMARY OF THE INVENTION

An embodiment of the present invention that is described herein provides a method including communicating between a memory controller and multiple memory devices over an interface that includes at least a control signal and an information signal. For each memory device, a respective individual skew parameter, which is indicative of a timing misalignment between the control signal and the information signal when communicating with that memory device, is produced. The respective individual skew parameter is stored coupled to each memory device. The timing misalignment is corrected at the memory device using the stored individual timing skew.

In some embodiments, the method includes deriving from respective individual skew parameters of the memory devices a common skew parameter that is applicable to the multiple memory devices. In some embodiments, producing the individual skew parameter includes setting the individual skew parameter to compensate for a residual timing misalignment remaining for the respective memory device after accounting for the common skew parameter. In other embodiments, the method includes storing the common skew parameter in the memory controller, and correcting the timing misalignment using both the common skew parameter and the individual skew parameter.

In an embodiment, producing the individual skew parameter includes setting a clock by which the control and information signals are generated to a first rate, and correcting the timing misalignment by setting the clock to a second rate, higher than the first rate. In another embodiment, the interface has first and second opposite communication directions, and producing the individual skew parameter includes calculating the individual skew parameter for the first direction, while communicating in the first direction at a first rate and in the second direction at a second rate that is smaller than the first rate. In yet another embodiment, producing the individual skew parameter includes measuring a reading error rate in a given memory device using an ECC module, and producing the individual skew parameter for the given memory device upon detecting that the error rate exceeds a predefined threshold.

In some embodiments, producing the individual skew parameter includes writing data to the memory device, reading the data from the memory device, and producing the individual skew parameter for the given memory device based on detected differences between the written and the read data. In other embodiments, producing the individual skew parameter includes producing different individual skew parameters for read and for write operations.

There is also provided, in accordance with an embodiment of the present invention, apparatus including multiple memory devices and a memory controller. The memory controller is configured to communicate with the multiple memory devices over an interface that includes at least a control signal and an information signal, to produce, for each memory device, a respective individual skew parameter that is indicative of a timing misalignment between the control signal and the information signal when communicating with that memory device, to provide the respective individual skew parameter for storage coupled to each memory device, and to cause each memory device to correct the timing misalignment using the stored individual timing skew.

The present invention will be more fully understood from the following detailed description of the embodiments thereof, taken together with the drawings in which:

DETAILED DESCRIPTION OF EMBODIMENTS

Overview

Figure 1A:
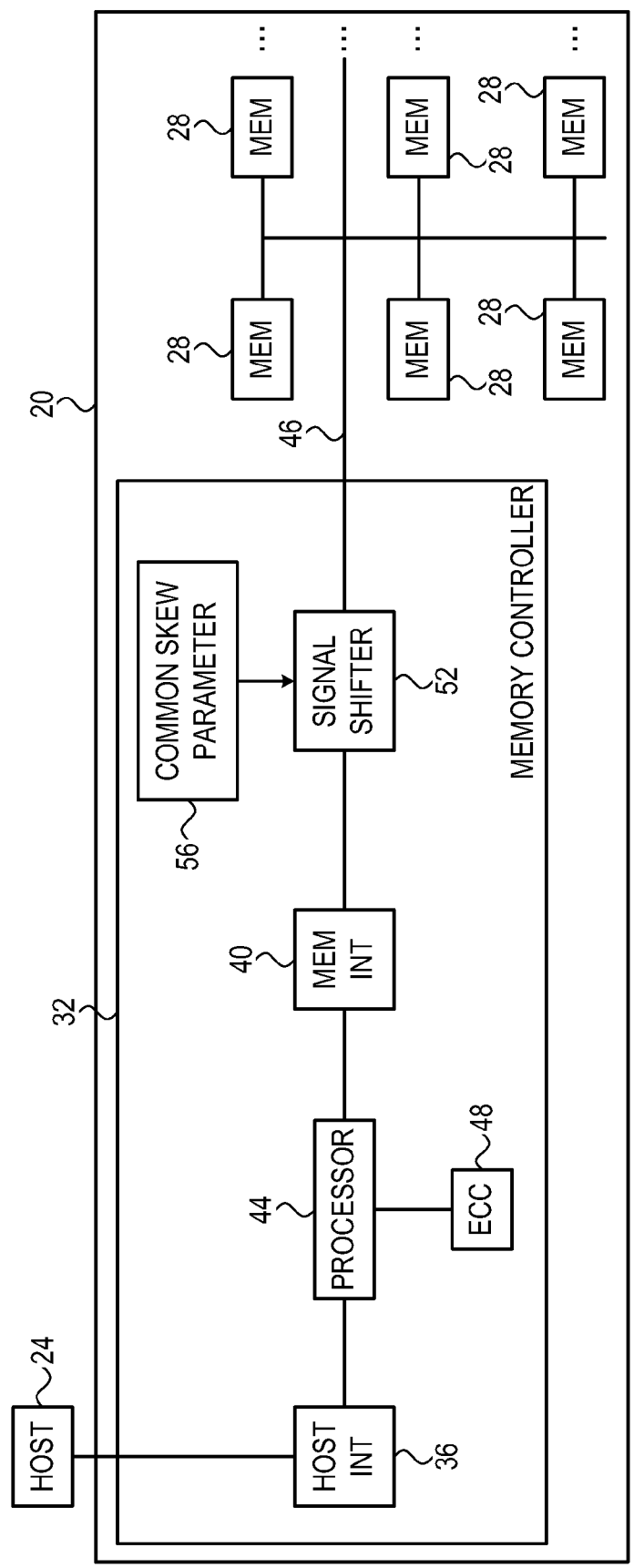
FIGS. 1A and 1B are block diagrams that schematically illustrate a memory system and a memory device, respectively, in accordance with an embodiment of the present invention.

Embodiments of the present invention that are described herein provide improved methods and systems for timing calibration between signals that propagate over a memory interface/bus. In some embodiments, a memory controller communicates with multiple memory devices over a bus that carries information and control signals.

To read stored data, the memory controller typically activates a control signal, also referred to as a strobe signal, by setting the respective strobe line to a suitable voltage level for certain time duration. After propagating along the strobe line, the strobe signal arrives at the memory device. The memory device uses the strobe signal to access the stored data with some additional read delay. The memory device sends the read data to the memory controller over the information lines along with a returned strobe signal that is used to latch the data at the controller.

During read operation the information and control signals sent by the memory device propagate along the bus lines towards the memory controller. To ensure reliable communication, the signals should be properly time-aligned when arriving at the destination. Multiple factors may affect the time alignment as seen on the memory controller side. For example, different wiring lengths of the bus lines may result with different propagation delays. Other factors include, for example, process variations at fabrication, and differences in voltage and/or temperature gradients between the controller and the memory devices. Additionally, the delay incurred when reading data out of the memory cells may differ from one memory device to another.

A similar situation occurs when the memory controller writes data to one of the memory devices. For reliable writing, information signals that carry the data to be written, and a respective strobe signal, should be properly time-aligned when reaching the memory device.

In some embodiments, the memory controller performs a calibration procedure to align the timing of the communication signals. In a presented embodiment, the timing misalignment between the control and information signals is measured separately per each memory device. The memory controller provides each memory device with a respective individual skew parameter, which is indicative of the timing misalignment between the control and information signals for that memory device. Each memory device stores and applies the individual skew parameter when communicating with the memory controller.

In some embodiments, the calibration process produces a common skew parameter that corrects a common timing misalignment applicable to all the memory devices, and individual skew parameters that correct the residual timing misalignment remaining for the individual memory devices. Typically, the common skew parameter is stored and applied at the memory controller, and the individual skew parameters are stored and applied at the respective memory devices. In some embodiments, different skew parameters are computed for each direction of the interface.

The stored skew parameters define respective timing shifts to align between bus signals. Applying the timing shifts at the memory devices reduces implementation complexity, since the memory controller is not required to manage different misalignments and timing shifts for different memory devices. From the perspective of the memory controller, the various memory devices all have the same timing alignment, even though in reality they may differ in timing shift.

System Description

Figure 1B:
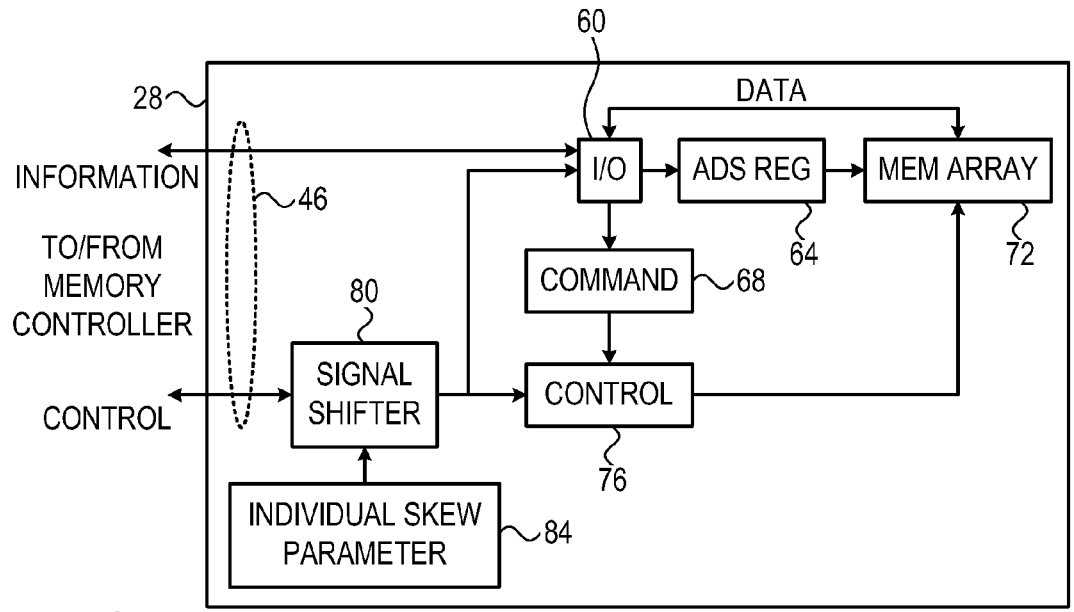

FIGS. 1A and 1B are block diagrams that schematically illustrate a memory system and a memory device, respectively, in accordance with an embodiment of the present invention. System 20 in FIG. 1A accepts data for storage from a host 24 and stores it in memory, and retrieves data from memory and provides it to the host. In the present example, system 20 comprises a Solid-State Drive (SSD) that stores data for a host computer. In alternative embodiments, however, system 20 may be used in any other suitable application and with any other suitable host, such as in computing devices, cellular phones or other communication terminals, removable memory modules, Secure Digital (SD) cards, Multi-Media Cards (MMC) and embedded MMC (eMMC), digital cameras, music and other media players and/or any other system or device in which data is stored and retrieved.

System 20 comprises multiple memory devices 28 sharing a common IO bus 46, each comprising multiple analog memory cells. System 20 stores data in the analog memory cells by programming the cells to assume respective memory states, which are also referred to as programming levels. The programming levels are selected from a finite set of possible levels, and each level corresponds to a certain nominal storage value. For example, a 2 bit/cell MLC can be programmed to assume one of four possible programming levels by writing one of four possible nominal storage values into the cell. The memory cells are typically arranged in a memory array comprising rows and columns.

Each memory device 28 may comprise a packaged device or an unpackaged semiconductor chip or die. A typical SSD may comprise a number of 4 GB devices. Generally, however, system 20 may comprise any suitable number of memory devices of any desired type and size. Although the system configuration of FIG. 1A comprises multiple memory devices, some of the methods and systems described herein can also be used in systems having only a single memory device.

System 20 comprises a memory controller 32, which accepts data from host 24 and stores it in memory devices 28, and retrieves data from the memory devices and provides it to the host. Memory controller 32 comprises a host interface 36 for communicating with host 24, a memory interface 40 for communicating with memory devices 28, and a processor 44 that processes the stored and retrieved data.

The memory controller communicates with memory devices 28 over interface (bus) 46 that typically comprises information and control lines. The memory controller comprises a shifter module 52 that performs time shifting to align the time position of one or more of the signals of bus 46, based on a common skew parameter (or parameters) stored in a local register 56.

In some embodiments, controller 32 encodes the stored data with an Error Correction Code (ECC). In these embodiments, controller 32 comprises an ECC unit 48, which encodes the data stored in devices 28 and decodes the ECC of data retrieved from devices 28. The functions of processor 44 can be implemented, for example, using software running on a suitable Central Processing Unit (CPU), using hardware (e.g., state machine or other logic), or using a combination of software and hardware elements.

Memory controller 32, and in particular processor 44, may be implemented in hardware. Alternatively, the memory controller may comprise a microprocessor that runs suitable software, or a combination of hardware and software elements. In some embodiments, processor 44 comprises a general-purpose processor, which is programmed in software to carry out the functions described herein. The software may be downloaded to the processor in electronic form, over a network, for example, or it may, alternatively or additionally, be provided and/or stored on tangible media, such as magnetic, optical, or electronic memory.

The system configuration of FIG. 1A is an example configuration, which is shown purely for the sake of conceptual clarity. Any other suitable memory system configuration can also be used. Elements that are not necessary for understanding the principles of the present invention, such as various interfaces, addressing circuits, timing and sequencing circuits and debugging circuits, have been omitted from the figure for clarity.

In the exemplary system configuration shown in FIG. 1A, memory devices 28 and memory controller 32 are implemented as separate Integrated Circuits (ICs). In alternative embodiments, however, the memory devices and the memory controller may be integrated on separate semiconductor dies in a single Multi-Chip Package (MCP) or System on Chip (SoC), and may be interconnected by an internal bus. Further alternatively, some or all of the memory controller circuitry may reside on the same die on which one or more of the memory devices are disposed. Further alternatively, some or all of the functionality of memory controller 32 can be implemented in software and carried out by a processor or other element of the host system, or by any other type of memory controller. In some embodiments, host 24 and Memory controller 32 may be fabricated on the same die, or on separate dies in the same device package.

FIG. 1B is a simplified diagram describing a single memory device 28, in accordance with an embodiment of the present invention. The memory device connects to bus 46 that carries information and control signals. Information signals typically carry data, address, and commands information. An I/O module 60 accepts information and control signals and de-multiplexes the information signals into separate data, address, and commands.

In the present example, addresses are stored in an address register 64. Commands (such as READ and WRITE commands) are stored in a command register 68, whereas data is stored in, or retrieved from, a memory array 72. I/O module 60 further comprises one or more Random Access Memory (RAM) data buffers that hold the data prior to writing into memory array 72. A control module 76 accepts control signals and commands, and generates internal control signals for handling the device operation. Control signals may be shifted in time by a signal shifter 80 before sent to module 60, to control module 76, and/or back to the memory controller.

The time shift value, also referred to as an individual skew parameter, is stored in a register 84. In some embodiments, shifter 80 (and/or shifter 52) may comprise a concatenation of delay elements, and the individual skew parameter encodes which of the delay elements are incorporated to create the total time shift. In general however, any other suitable time shifter, such as configurable analog or digital time shifter may be used. For maximal operating speed, control and information signals should be optimally time aligned, as explained below.

In some embodiments, during the calibration of timing misalignment, data written to the RAM data buffers in I/O module 60 is not delivered to memory array 72. In such embodiments, errors that may be contributed by the analog memory array are eliminated from the interface calibration process.

The memory configuration of FIG. 1B is an example configuration, which is shown purely for the sake of conceptual clarity. Any other suitable memory device configuration can also be used. Elements that are not necessary for understanding the principles of the present invention, such as various interfaces, addressing circuits, timing and sequencing circuits and debugging circuits, have been omitted from the figure for clarity.

In FIG. 1B, a signal shifter connects directly to the control lines. In other embodiments however, in system 20, a signal shifter may be positioned at the memory controller side and/or at some or all of the memory devices.

In FIGS. 1A and 1B, compensating for timing misalignments is carried out by applying time shift to one or more control signals. In other embodiments however, time shift may additionally or alternatively be applied to one or more information signals.

Memory Interface Signals and Timing

Memory controller 32 communicates with memory devices 28 using time aligned signals applied to bus lines 46. Signals are typically categorized into information and control signals. For example, to retrieve data from the memory device, the memory controller may send over the bus lines, a read command followed by a respective memory address. Control signals are used to separate between dedicated pieces of information that the controller sequentially sends or receives over the same information lines.

In the last example, the controller activates a respective read control signal when the command is ready on the bus lines. After the command is safely latched by the control signal at the memory device, the memory controller sets a memory address on the bus lines and activates another control signal to latch the address at the memory device. Then the memory controller waits for the data retrieved from the memory to appear on the information lines, and internally latches the data using a returned control signal provided by the memory device.

As another example, the controller may perform a write operation by sending a write command, followed by respective address, and data to be written. Again, each of the command/address/data information pieces should be sent with accompanying control signals.

Figure 2:
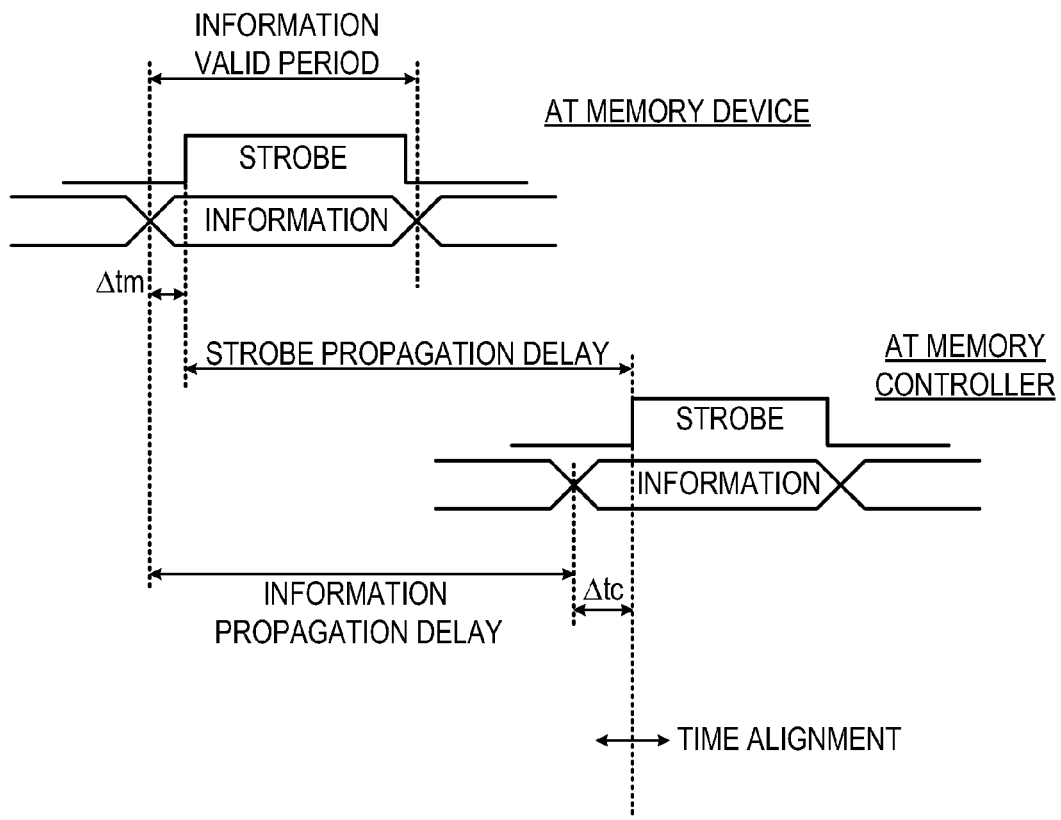
FIG. 2 is a diagram that schematically illustrates timing relationships between bus signals, in accordance with an embodiment of the present invention.

FIG. 2 is a diagram that schematically illustrates timing relationships between signals of bus 46, in accordance with an embodiment of the present invention. The figure depicts signals related to a read operation, originating at one of the memory devices and arriving at the memory controller after some propagation delay. In the figure, STROBE denotes a control signal, and INFORMATION denotes an information signal such as a data bit, an address bit, or a command bit signal. A data bit is also denoted DQ and a respective strobe signal is denoted DQS.

As described above, upon receiving a read command, the memory device retrieves data from memory array 72 or directly from the data buffer in I/O module 60 during timing calibration, and transfers the data to the information lines through I/O module 60. Additionally, the memory device provides possibly time shifted control/strobe signals to latch the data at the memory controller. In FIG. 2, the memory device sets the STROBE signal shortly after the INFORMATION signal becomes valid, i.e., after a $\Delta tm$ time delay. Moreover, the STROBE signal ends while the INFORMATION signal is still valid. In some embodiments, the memory device activates the STROBE and the INFORMATION signals simultaneously, resulting in $\Delta tm=0$.

Both the STROBE and the INFORMATION signals travel along respective routed wiring of bus 46 towards the memory controller. In the example of FIG. 2, the STROBE signal arrives at the memory controller after a time duration denoted STROBE PROPAGATION DELAY, and the INFORMATION signal arrives at the memory controller after a different time duration denoted INFORMATION PROPAGATION DELAY. Thus, as seen by the memory controller, the STROBE signal starts with $\Delta tc$ time delay relative to the instance where the INFORMATION signal becomes valid.

Generally, Δtm and Δtc may differ from one another.

Moreover, Δtm may differ among memory devices, as the internal read delay incurred when retrieving data out of the memory may be different for each device. Additionally, since the signals travel along different wiring routs, Δtc may be different for each memory device.

Without compensating for the differences in time alignment, the information valid period should be extended, therefore limiting the operating speed of the memory system. As depicted in FIG. 2, the time alignment between the STROBE and the INFORMATION signals may be carried out at the memory controller and/or at each memory device. A memory device may control Δtm using shifter 80, and the memory controller may control Δtc using shifter 52.

Interface Timing Calibration

Figure 3:
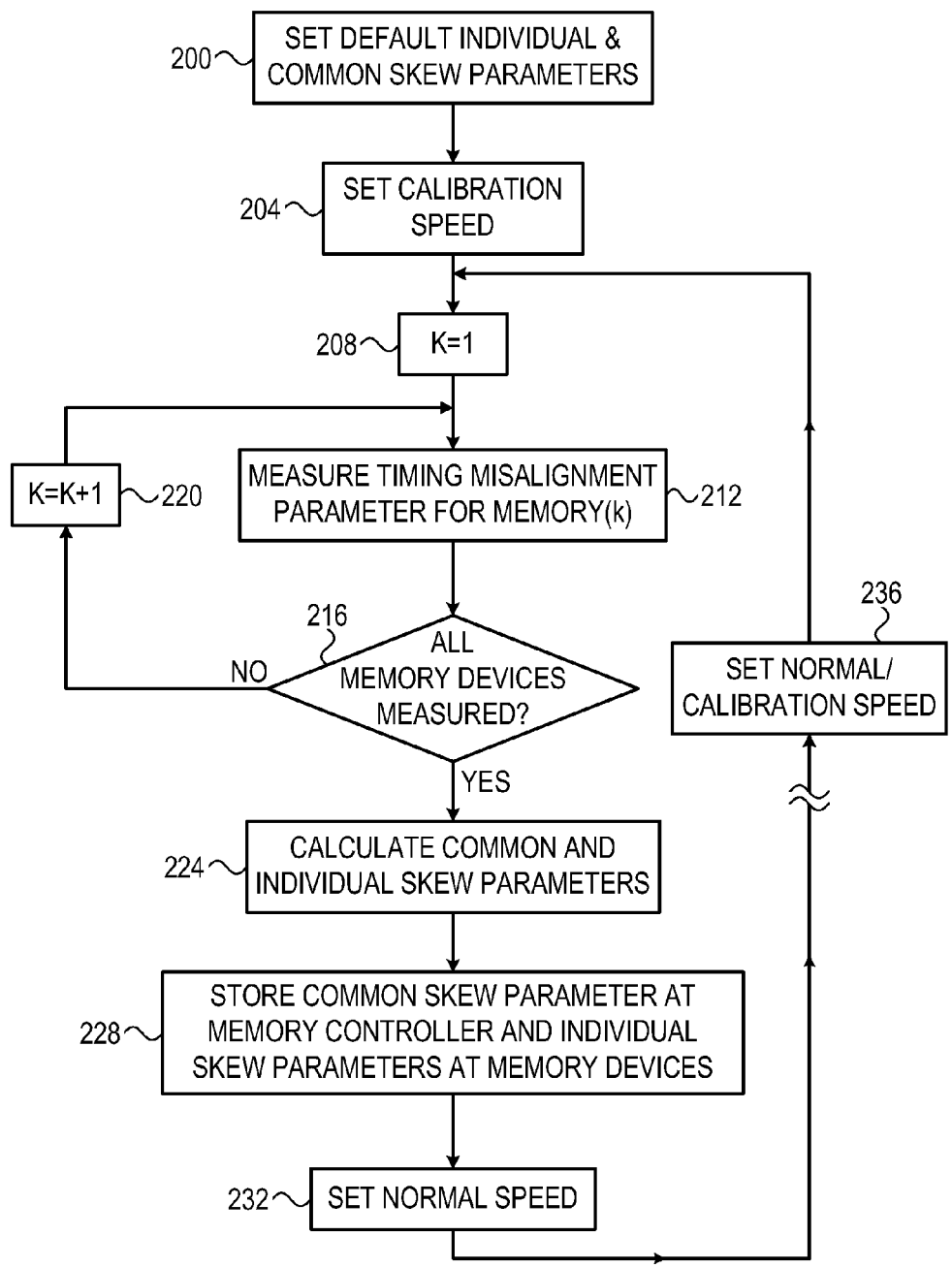
FIG. 3 is a flow chart that schematically illustrates a method for timing calibration among signals of a memory interface, in accordance with an embodiment of the present invention.

FIG. 3 is a flow chart that schematically illustrates a method for timing calibration among signals of a memory interface, in accordance with an embodiment of the present invention. The purpose of timing calibration is to derive skew parameters so as to optimally compensate for timing misalignments.

Optimal skew parameters may differ between write communication (from the memory controller to the memory device) and read communication (from the memory device to the memory controller). The method described in FIG. 3 can be used for calibrating both write and read skew parameters, for example, by executing the flow of FIG. 3 separately for write and for read calibration. When calibrating skew parameters for one communication direction, the rate for that direction is configured to be normal and the rate for the opposite direction is configured to be lower than normal so that reliable communication in the opposite direction can be assumed.

The method begins with memory controller 32 setting default common and individual skew parameters in registers 56 and 84, at a set default parameters step 200.

Default skew parameters may be derived, for example, at fabrication time. Additionally or alternatively, the memory controller may get default skew parameters from host 24. Further additionally or alternatively, the memory controller may use any suitable method to derive default skew parameters.

Since the default skew parameters can only roughly compensate for timing misalignments, when calibrating skew parameters for one communication direction memory controller 32 configures the system for a reduced speed operation for the opposite communication direction at a set calibration speed step 204. Using lower rate for the opposite communication direction guarantees reliable communication for that direction.

Thus, in order to calibrate the read skew parameters, the memory controller writes at a reduced rate so that data is written reliably, and reads at normal rate to calibrate the parameter. Similarly, to calibrate the write skew parameters, the memory controller writes at normal rate and reads at a reduced rate.

The memory controller may control the system operating speed by setting a clock by which the control and information signals are generated to a suitable rate. At low speeds the memory system can tolerate some level of timing misalignment and still function reliably. At step 204, the memory controller may select any suitable reduced speed value to guarantee reliable communication in the direction that is currently not under calibration. For example, the memory controller may set a signaling speed that is about half the nominal speed that may be achieved after timing calibration, or the lowest speed supported.

Memory controller 32 then prepares for measuring individual calibration skew parameters by setting an index variable K to one at a reset index step 208. The variable K serves to index individual memory devices. The memory controller measures the timing misalignment of the memory device indexed by K (i.e., measures the timing misalignment between the control and information signals for the memory device indexed by K), at a measure parameter step 212. The memory controller may use any suitable method for measuring the optimal calibration parameter as known in the art. At step 212 the memory controller performs write and read operations at speeds or rates as selected at step 204 above. Additionally, the memory controller may compare read data to the corresponding written data (at the specified rates) and adjust timing misalignment until data match is achieved.

Memory controller 32 checks if all the memory devices were measured, at a loop termination step 216. In case the result at step 216 is negative, the memory controller increments K at an increment step 220, and loops back to step 212 to measure the next memory device.

Having measured the misalignments of all the memory devices, memory controller 32 calculates a common and individual skew parameters at a calculate step 224. The common skew parameter is applicable to all the memory devices. Each individual skew parameter is indicative of the residual timing misalignment in the corresponding memory device, after correcting the misalignment using the common skew parameter.

The memory controller may use any suitable calculation method at step 224. For example, the common skew parameter may be calculated as the mean, median, minimal, or maximal value of the measured parameters. Each individual parameter may be calculated, for example, by subtracting the common parameter value from the respective measured parameter. In some embodiments, some or all of the individual parameters may result in positive and/or negative values. In other embodiments, the common parameter may be taken as the minimal or maximal value respectively, to avoid using individual skew parameters of opposite signs.

It should be appreciated that in the current context the term parameter may correspond to a scalar continuous or discrete value, or to a vector entity comprising multiple such scalars. For example, a vector parameter may relate to a set of multiple control signals. Additionally or alternatively, a vector parameter may be multidimensional. For example, the memory controller may measure multiple physical parameters that may influence timing misalignment such as skew parameter, temperature, and operating voltage and frequency to compose a vector parameter. The signal shifter may map that vector to a corresponding time shift.

The memory controller stores the calculated common skew parameter to a local register 56 at a store parameters step 228. Still at step 228, the memory controller stores the individual calculated skew parameters to a respective register 84 of each memory device. At this point, memory system 20 is considered calibrated and the memory controller sets the system to a normal or nominal working speed for both communication directions at set normal speed 232.

As timing misalignments may drift over time, memory controller 32 may occasionally repeat the described calibration process. The memory controller may use any suitable method to decide when to perform timing recalibration. For example, the memory controller may recalibrate periodically or after performing a certain amount of program/erase cycles. As another example, the memory controller may recalibrate the timing synchronized to other maintenance operations such as read threshold adjustments. As yet another example, in case the controller detects increased error rates at ECC 48 while retrieving data, the memory controller may set the system to a slower operating speed and check if the errors rate is reduced. In case slowing the operating speed improves reliability, the memory controller may decide to recalibrate the interface timing.

To perform recalibration, the memory controller selects a calibration speed (similar to step 204) at a set speed step 236. Since however this is not the initial calibration process, the memory controller may reduce the speed at step 236 (for the communication direction that is not under calibration) to a speed higher than the reduced speed selected at step 204, or even remain at the normal operating speed. The memory controller then loops back to step 208 to start the calibration process over again.

The method of FIG. 3 is an exemplary method, and other suitable methods may be used in alternative embodiments. For example recalibration may start at step 200 or 204 instead of step 208.

The example methods described above, an individual skew parameter is set per each memory device, and is typically used for timing alignment in both reading and writing operations. In alternative methods, however, separate individual skew parameters may serve for timing alignment in read and write operations.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
communicating between a memory controller and multiple memory devices over an interface that comprises at least a control signal and an information signal;
for each memory device, producing a respective individual skew parameter, which is indicative of a timing misalignment between the control signal and the information signal when communicating with that memory device; and
storing the respective individual skew parameter coupled to each memory device, and correcting the timing misalignment at the memory device using the stored individual timing skew.

2. The method according to claim 1, and comprising deriving from respective individual skew parameters of the memory devices a common skew parameter that is applicable to the multiple memory devices.

3. The method according to claim 2, wherein producing the individual skew parameter comprises setting the individual skew parameter to compensate for a residual timing misalignment remaining for the respective memory device after accounting for the common skew parameter.

4. The method according to claim 2, and comprising storing the common skew parameter in the memory controller, and correcting the timing misalignment using both the common skew parameter and the individual skew parameter.

5. The method according to claim 1, wherein producing the individual skew parameter comprises setting a clock by which the control and information signals are generated to a first rate, and wherein correcting the timing misalignment comprises setting the clock to a second rate, higher than the first rate.

6. The method according to claim 1, wherein the interface has first and second opposite communication directions, and wherein producing the individual skew parameter comprises calculating the individual skew parameter for the first direction, while communicating in the first direction at a first rate and in the second direction at a second rate that is smaller than the first rate.

7. The method according to claim 1, wherein producing the individual skew parameter comprises measuring a reading error rate in a given memory device using an ECC module, and producing the individual skew parameter for the given memory device upon detecting that the error rate exceeds a predefined threshold.

8. The method according to claim 1, wherein producing the individual skew parameter comprises writing data to the memory device, reading the data from the memory device, and producing the individual skew parameter for the given memory device based on detected differences between the written and the read data.

9. The method according to claim 1, wherein producing the individual skew parameter comprises producing different individual skew parameters for read and for write operations.

10. An apparatus, comprising:
multiple memory devices; and
a memory controller, which is configured to communicate with the multiple memory devices over an interface that comprises at least a control signal and an information signal, to produce, for each memory device, a respective individual skew parameter that is indicative of a timing misalignment between the control signal and the information signal when communicating with that memory device, to provide the respective individual skew parameter for storage coupled to each memory device, and to cause each memory device to correct the timing misalignment using the stored individual timing skew.

11. The apparatus according to claim 10, wherein the memory controller is further configured to derive from respective individual skew parameters a common skew parameter that is applicable to the multiple memory devices.

12. The apparatus according to claim 11, wherein the memory controller is configured to produce the individual skew parameter by setting the individual skew parameter to compensate for a residual timing misalignment remaining for the respective memory device after accounting for the common skew parameter.

13. The apparatus according to claim 11, wherein the memory controller is further configured to store the common skew parameter in the memory controller, and to correct the timing misalignment using both the common skew parameter and the individual skew parameter.

14. The apparatus according to claim 10, wherein the memory controller is configured to produce the individual skew parameter by setting a clock by which the control and information signals are generated to a first rate, and to correct the timing misalignment by setting the clock to a second rate, higher than the first rate.

15. The apparatus according to claim 10, wherein the interface has first and second opposite communication directions, and wherein the memory controller is configured to produce the individual skew parameter by calculating the individual skew parameter for the first direction, while communicating in the first direction at a first rate and in the second direction at a second rate that is smaller than the first rate.

16. The apparatus according to claim 10, wherein the memory controller is configured to produce the individual skew parameter by measuring a reading error rate in a given memory device using an ECC module, and to produce the individual skew parameter to the given memory device upon detecting that the error rate exceeds a predefined threshold.

17. The apparatus according to claim 10, wherein the memory controller is configured to produce the individual skew parameter by writing data to the memory device, reading the data from the memory device, and producing the individual skew parameter for the given memory device based on detected differences between the written and the read data.

18. The apparatus according to claim 10, wherein the memory controller is configured to produce the individual skew parameter by producing individual skew parameters for read and for write operations.

* * * * *